April 3, 1962 L. PARKIN ETAL 3,027,609
FASTENERS ADAPTED TO BE MOUNTED IN AN
APERTURE OR RECESS OF A SUPPORT
Filed June 12, 1958
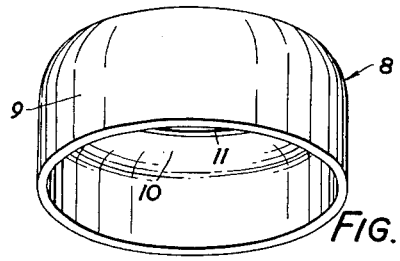
FIG. 1.
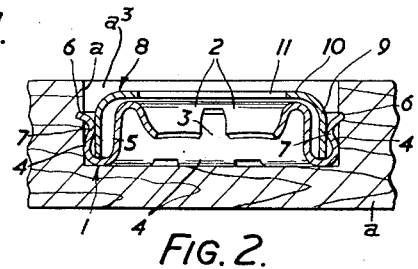
FIG. 2.
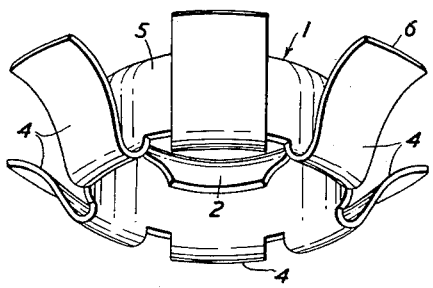
FIG. 3.
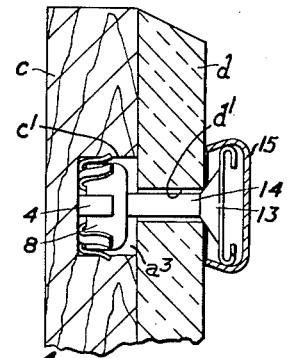
FIG. 4.
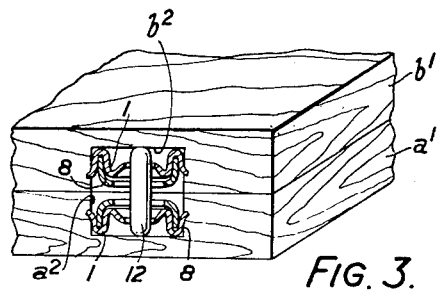
FIG. 5.            FIG. 6.
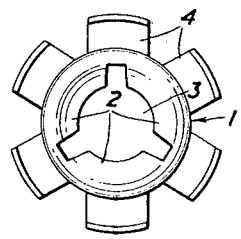          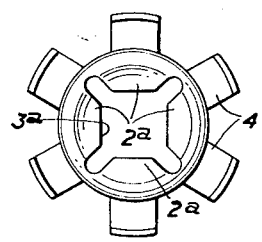
FIG. 7.
INVENTORS:
LESLIE PARKIN,
JOHN SIMPSON,
BY Walter P. Jones
ATTORNEY
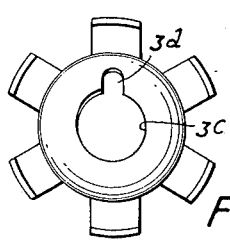

United States Patent Office 3,027,609
Patented Apr. 3, 1962

3,027,609
FASTENERS ADAPTED TO BE MOUNTED IN AN APERTURE OR RECESS OF A SUPPORT
Leslie Parkin, Bobbers Hill, and John Simpson, Old Basford, England, assignors to United-Carr Fastener Corporation, Wilmington, Del., a corporation of Delaware
Filed June 12, 1958, Ser. No. 741,603
Claims priority, application Great Britain June 19, 1957
3 Claims. (Cl. 20—92)

This invention relates to a fastener adapted to be mounted in an aperture or recess of a support, the fastener being provided with an opening the edges of which are formed with means for engaging a rod like member. One of the problems connected with the use of such fasteners is to provide a satisfactory rigid anchoring for the fastener in the aperture or recess formed in the support and this problem is particularly troublesome where the support comprises a relatively thin panel. In this case the recess to receive the fastener has to be shallow and the fastener itself, as it has to be housed in the recess, must of necessity be of relatively small axial depth and it is difficult, therefore, to ensure that it will be rigidly secured in the recess.

It is an object of the present invention to provide an improved fastener which while of general application is particularly suitable for mounting in a shallow recess or in an aperture of a relatively thin support.

According to the present invention a fastener includes a rod or stud engaging part and an attaching part, the former comprising a body formed with an aperture the edges of which are shaped for engagement with an inserted rod or the like, the body also being provided with a series of tongues or fingers projecting outwardly thereof, the attaching part comprises a sleeve like member adapted to be positioned over the body of the rod engaging part so as to be capable, when moved axially thereof, to engage the fingers and force them outwardly into engagement with the wall of the recess or aperture in which the fastener is mounted.

In use the rod or like engaging part is positioned in a recess in a support so that the body portion thereof is spaced from the bottom of the recess and the tongues are disposed adjacent to the wall of the recess. The attaching part is positioned over the body so that the wall of the sleeve is disposed between the said body and the fingers. The attaching part is then forced inwardly of the recess to cause the wall of the sleeve to engage the fingers and displace them radially outwardly so that the free ends thereof will dig into the wall of the recess. The rod engaging part is thereby securely anchored in the recess and the attaching part is retained in position by the friction between its wall and the fingers of the fastener part and in effect forms a cover for the fastener part.

Preferably the fingers on the rod engaging part are formed with portions projecting inwardly towards the body so as to extend into the path of the wall of the sleeve when the latter is moved into position.

To enable the invention to be fully understood it will now be described with reference to the accompanying drawing in which:

FIG. 1 is a perspective view of the rod and attaching parts of a fastener according to one embodiment of the invention, FIG. 2 is a sectional side view on a reduced scale of the fastener assembled in a recess in a panel, FIG. 3 is a perspective view in section showing a pair of panels secured by two fasteners connected by a dowel pin, FIG. 4 is a side view partly in section showing an alternative use of the fastener for securing two panels, FIG. 5 is a plan view of the fastener part shown in FIGS. 1 to 4.

FIG. 6 is a plan view of a modified fastener, and

FIG. 7 is a plan view of a further modified fastener.

As shown in the accompanying drawing the fastener includes a rod engaging part made of metal and comprising a dome or like shaped body portion 1, the top of which is cut away to provide a series of resilient tongues 2, the free ends of which define a rod receiving aperture 3. The tongues are preferably inclined inwardly and downwardly from the top of the body so that they will make frictional gripping engagement with an inserted rod and resist any attempt to withdraw the rod once it is inserted. The end of the peripheral wall 5 of the dome shaped body remote from the aperture 3 is provided with a series of reversely bent fingers 4 extending axially of the cylindrical wall 5 of the body 1 and spaced outwardly thereof. As shown the free ends 6 of the fingers are inclined outwardly away from the wall 5. An intermediate portion of the said fingers is bent to provide an inwardly projecting shoulder 7.

The attaching part comprises a sleeve or cap like member 8 having a peripheral wall 9 of a diameter greater than the wall 5 of the dome shaped body but slightly less than that defined by the inner surfaces of the fingers 4. The upper end of the sleeve is formed with an inwardly extending radial flange 10 defining an aperture 11 of sufficient size to permit the end of a rod or the like to be assembled with the fastener, to extend therethrough.

The dome shaped rod engaging part is assembled in a recess $a^3$ in a panel or like support $a$ so that the bight formed between the lower end of the wall 5 and the fingers 4 rests on the bottom of the recess and the free ends 6 of the fingers are disposed adjacent to the wall of the recess. When assembled in this manner the top of the dome which is formed with the rod gripping tongues will be disposed in spaced relation to the bottom of the recess $a^1$ but flush with or slightly below the open end thereof.

In order to secure the rod engaging part in the recess, the sleeve 8 is positioned so that the end of its peripheral wall 9 remote from the flange 10 is disposed between the wall 5 of the dome shaped body and the fingers. The sleeve is then forced axially inwardly of the recess $a^3$ so that it will engage the shoulders 7 on the fingers and force the latter radially outwardly to cause the free ends 6 to dig into the wall of the recess. The sleeve will accordingly be retained in position by the frictional grip provided by the fingers which are retained in gripping engagement with the wall of the recess by the attaching member 8.

The flanged outer end of the latter will extend inwardly over the dome with the aperture 11 defined by the flange registering with the rod receiving aperture 3 in the top of the dome shaped member 1.

Accordingly a rod, stud or like member is readily insertable axially into the rod or stud receiving aperture so as to be frictionally gripped by the edges of the tongues 2. As the tongues are inclined towards the bottom of the recess the rod or the like will be rigidly secured against withdrawal in an axial direction.

In FIG. 3 is shown a pair of panels $a^1$, $b^1$ secured together in superposed relation by the fastener devices. As shown each panel is formed with a recess $a^2$, $b^2$ in each of which a rod engaging part 1 of the fastener is secured by an attaching sleeve 8 as previously described. The fastener devices are in opposed relation and to secure the panels, a dowel rod 12 is entered into the aperture defined by the tongues 2 of one fastener so as to be frictionally gripped thereby. The second panel is then assembled in superposed relation over the first to align the projecting end of the dowel rod 12 with the rod receiving aperture of the fastener assembled with the second panel and the two panels are then forced together to cause the said end of the dowel rod to enter said aperture so as to be gripped by said tongues.

FIG. 4 illustrates an alternative method of securing two panels. As shown a panel $c$ is formed with a recess $c^1$ in which a fastener is assembled as previously described. A panel $d$ is formed with an aperture $d^1$ and a stud having a head 13 and a shank 14 is provided, the shank being inserted through the aperture $d^1$ and into the stud engaging aperture of the fastener assembled in the recess $c^1$ so as to be gripped thereby. As the head 13 engages the outer face of the panel $d$ the two panels are secured together. A cap 15 is provided which is adapted to be snapped over the head 14.

The rod attaching part shown in FIG. 5 is formed with three tongues 2 having arcuate shaped free ends defining a circular aperture 3 to receive a rod, stud or the like of corresponding cross section.

In the modification according to FIGURE 6 four tongues $2a$ are provided the free ends having straight edges which define a square shaped aperture $3a$ to receive a rod, stud or the like of corresponding cross section.

According to the further modification shown in FIG. 7 the rod or stud engaging aperture $3c$ is of circular shape and has a radial slot $3d$. The edges of the aperture $3c$ are bent or curved into the form of part of a helix to form thread engaging means to make screw threaded engagement with a screw threaded rod, stud or the like.

While the fastener of the present invention is applicable for securing any rod, stud, screw or like member to a support, it is particularly adapted for use in securing two panels or parts to one another by means of a dowel rod, for example for securing parts of furniture such as legs or feet to a frame, or for securing parts of a shed or similar structure such as securing the walls, roof or units of the shed or the like to one another. In the application of the invention for securing parts of furniture or structures as described above, it will be understood that fasteners as described above will be assembled in one or more recesses in each of the two parts to be secured.

It will be understood that any desired number of such fasteners may be provided in the panels.

The invention is particularly useful where relatively thin panels have to be secured or in other cases where the fastener receiving recesses are relatively shallow. In these cases the rod or like engaging part will of necessity have to be of relatively short axial length to fit into the recess and the means for securing the fastener in the recess ensures that this can be effected in a rigid and positive manner.

The panels or supports to which the fasteners are adapted to be assembled may be made of wood, plastic or other suitable material.

We claim:
1. A fastening device, for mounting in an aperture in a support, comprising a support-engaging member and an attaching member, said support-engaging member being a cup-shaped bowl having a body portion and having a slotted peripheral flange integral with a series of deformable fingers, each of said fingers spaced from the others, the distal ends of said fingers extending in a direction upward from said peripheral flange and outward from the axis of said cup-shaped bowl, said cup-shaped bowl having tongue members attached thereto extending downwardly adjacent a central aperture formed in said bowl, said attaching member including an apertured dome member inserted between said deformable fingers and said body portion whereby the apertures are in registration and axial pressure on said attaching member will force said distal ends into biting engagement with the walls of said support.

2. A fastening device as set forth in claim 1, wherein said tongue members are in circumscribing, biting engagement with a dowel or the like said dowel extending beyond said dome member.

3. The combination of a pair of supports each of said supports having a wall defining an aperture, a pair of fastening devices and a dowel or the like, each of said fastening devices comprising a support-engaging member and an attaching member, said support-engaging member being a cup-shaped bowl having a body portion and having a slotted peripheral flange integral with a series of deformable fingers, each of said fingers spaced from the others, the distal ends of said fingers extending in a direction upward from said peripheral flange and outward from the axis of said cup-shaped bowl, said cup-shaped bowl having tongue members attached thereto extending downwardly adjacent a central aperture formed in said bowl, said attaching member including an apertured dome member inserted between said deformable fingers and said body portion, and each of said fasteners having its deformable fingers in engagement with one of said walls and said tongue members of each of said cup-shaped bowls engaging said dowel.

References Cited in the file of this patent

UNITED STATES PATENTS

| 637,141 | Marx | Nov. 14, 1899 |
| 1,531,916 | Flintjer | Mar. 31, 1925 |
| 1,832,706 | Hoshor | Nov. 17, 1931 |
| 1,998,251 | Pool | Apr. 16, 1935 |
| 2,091,882 | Robinson | Aug. 31, 1937 |
| 2,658,248 | Kost | Nov. 10, 1953 |
| 2,730,419 | Watrous | Jan. 10, 1956 |

FOREIGN PATENTS

| 634,116 | Great Britain | Mar. 15, 1950 |